United States Patent
Busch et al.

(10) Patent No.: US 7,600,020 B2
(45) Date of Patent: *Oct. 6, 2009

(54) SYSTEM AND PROGRAM PRODUCT FOR TRACKING WEB USER SESSIONS

(75) Inventors: Edward Vernon Busch, Raleigh, NC (US); Troy Anthony Howard, Durham, NC (US); Andrei Stephan Malacinski, Apex, NC (US); Tai Woo Nam, Cary, NC (US); Mary Catherine Streble, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/134,114

(22) Filed: Jun. 5, 2008

(65) Prior Publication Data

US 2008/0275982 A1 Nov. 6, 2008

Related U.S. Application Data

(63) Continuation of application No. 10/244,191, filed on Sep. 16, 2002, now Pat. No. 7,389,343.

(51) Int. Cl.
*G06F 15/173* (2006.01)

(52) U.S. Cl. .............. 709/224; 709/203; 709/217; 709/223; 709/229

(58) Field of Classification Search ............. 709/224, 709/223, 203, 217, 219, 228, 229
See application file for complete search history.

(56) References Cited

U.S. PATENT DOCUMENTS

| | | | |
|---|---|---|---|
| 5,964,836 A | 10/1999 | Rowe et al. | |
| 5,966,705 A * | 10/1999 | Koneru et al. | 707/9 |
| 6,052,730 A | 4/2000 | Felciano et al. | |
| 6,098,093 A * | 8/2000 | Bayeh et al. | 709/203 |
| 6,223,215 B1 * | 4/2001 | Hunt et al. | 709/217 |
| 6,278,966 B1 | 8/2001 | Howard et al. | |
| 6,286,046 B1 | 9/2001 | Bryant | |
| 6,308,212 B1 | 10/2001 | Besaw et al. | |
| 6,363,478 B1 | 3/2002 | Lambert et al. | |
| 6,381,632 B1 * | 4/2002 | Lowell | 709/203 |
| 6,480,894 B1 * | 11/2002 | Courts et al. | 709/227 |
| 6,496,824 B1 * | 12/2002 | Wilf | 707/10 |
| 6,584,505 B1 * | 6/2003 | Howard et al. | 705/225 |
| 6,665,658 B1 * | 12/2003 | DaCosta et al. | 707/3 |
| 6,789,170 B1 * | 9/2004 | Jacobs et al. | 711/133 |
| 6,879,994 B1 * | 4/2005 | Matsliach et al. | 709/204 |

(Continued)

OTHER PUBLICATIONS

Thubert, P., Miller, J., "Session sharing in a cluster of Java servers," IBM Research Disclosure #430142, Feb. 2000, p. 355.

*Primary Examiner*—Lashonda T Jacobs
(74) *Attorney, Agent, or Firm*—Hoffman Warnick LLC

(57) ABSTRACT

The present invention provides a solution for efficiently tracking web user sessions. Specifically, under the present invention, web user sessions are tracked on an analytics system based upon a unique identifier assigned to a requested web page and a session cookie that identifies a particular web user session. By tracking web user sessions in this manner, web page data transmitted during a particular web user session can be efficiently and accurately correlated for analysis.

18 Claims, 4 Drawing Sheets

U.S. PATENT DOCUMENTS

| | | |
|---|---|---|
| 2002/0042821 A1 | 4/2002 | Muret et al. |
| 2002/0046281 A1 | 4/2002 | Cope |
| 2002/0062347 A1 | 5/2002 | Low et al. |
| 2002/0065912 A1* | 5/2002 | Catchpole et al. ........... 709/224 |
| 2002/0073150 A1 | 6/2002 | Wilcock |
| 2002/0073211 A1 | 6/2002 | Lin et al. |
| 2002/0078191 A1* | 6/2002 | Lorenz ....................... 709/223 |
| 2002/0143925 A1* | 10/2002 | Pricer et al. ................. 709/224 |
| 2003/0065770 A1* | 4/2003 | Davis et al. ................. 709/224 |
| 2003/0110266 A1* | 6/2003 | Rollins et al. ............... 709/227 |
| 2003/0163563 A1* | 8/2003 | Bean ......................... 709/224 |
| 2004/0015580 A1* | 1/2004 | Lu et al. ..................... 709/224 |
| 2005/0188318 A1* | 8/2005 | Tamir et al. ................. 715/744 |

\* cited by examiner

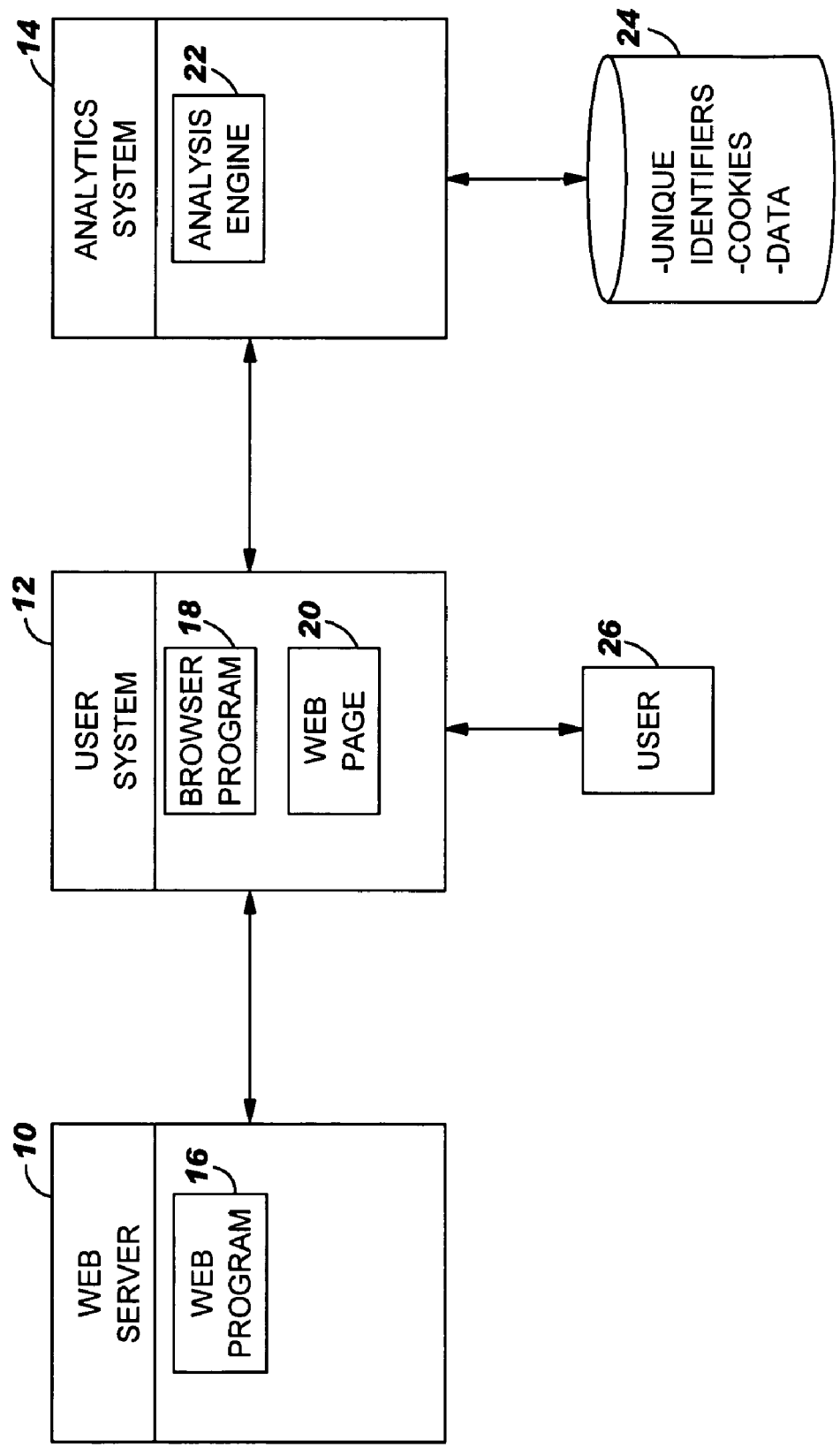

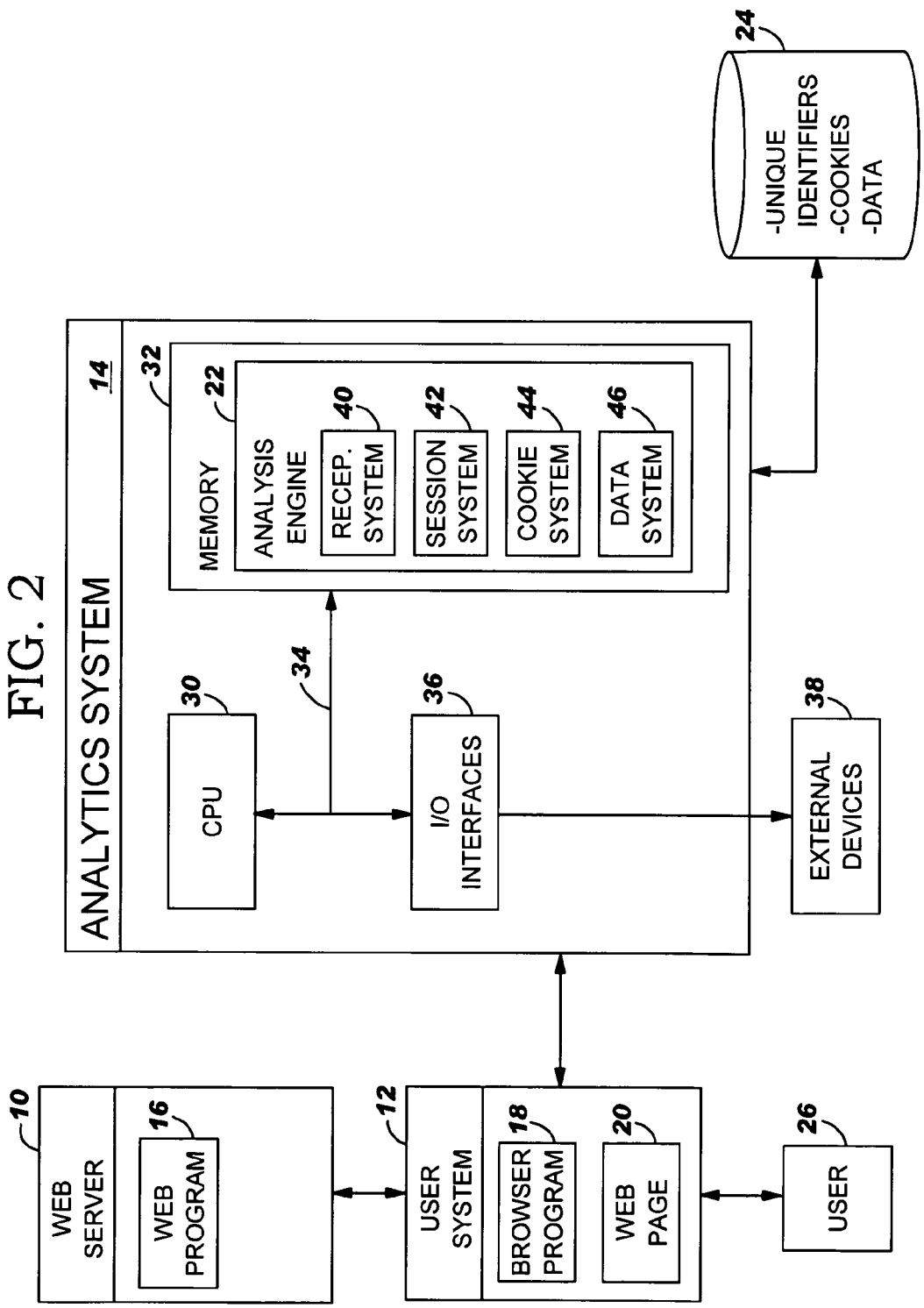

SYSTEM AND PROGRAM PRODUCT FOR TRACKING WEB USER SESSIONS

REFERENCE TO PRIOR APPLICATIONS

This application is a continuation application of U.S. patent application Ser. No. 10/244,191, filed on Sep. 16, 2002 now U.S. Pat. No. 7,389,343, which is hereby incorporated by reference.

BACKGROUND OF THE INVENTION

1. Field of the Invention

In general, the present invention relates to a, system and program product for tracking web user sessions. Specifically, the present invention allows website usage data such as user volume and referring sources to be collected on an analytics system.

2. Background Art

As the use of websites in commerce becomes more pervasive, the need to track usage volume grows. Specifically, a website is only effective if it is being used. Accordingly, determining usage volumes has become am important part of web analytics. In general, website usage volumes can be used to answer numerous questions about a website. For example, the usage volumes can be used to determine, among other things: (1) how frequently the resources on the website are downloaded; (2) what resources are downloaded most frequently; (3) what web pages within the website are users visiting; (4) what are the most frequently visited web pages; (5) how many users are visiting the website on a given day; (6) how many users are visiting the website at any one time; and (7) how were the users referred to the website.

Traditionally, website usage data has been collected in HTTP log data. The data in the log is then analyzed by applying various algorithms. However, the accuracy of user session determination during HTTP log data analysis is not always ensured. Another method for analyzing website usage data involves the specification of a user cookie or web application parameter. The cookie is typically set by the website application while serving the web pages to the website user. It is then necessary for the website implementor to convey the cookie or parameter used to identify user sessions to an analytics engine. Unfortunately, the cookie or parameter is not available during the first request to the website. Moreover, the burden of implementing this solution is placed on the production website developer.

In view of the foregoing, there exists a need for a method, system and program product for tracking website usage data. Specifically, a need exists for a solution that can track web user sessions. A further need exists for an initial communication to be sent to an analytics system upon receipt of a web page on a user system. A need exists for the communication to include a unique identifier corresponding to the received web page. In addition, there exists a need for the analytics system to provide a session cookie that corresponds to a current web user session, and to transmit the session cookie back to the user system. Still yet, a need exists for all subsequent communications in the same web user session to be correlated with the initial communication based on the unique identifier and the session cookie.

SUMMARY OF THE INVENTION

In general, the present invention provides a method, system and program product for tracking web user sessions. Specifically, under the present invention, a user requests a web page on a user system. When the web page is delivered from the web server, program code within the web page is executed to generate a unique identifier corresponding to the web page. The unique identifier includes a unique value that corresponds specifically to the web page, and a time stamp indicating the date and/or time the web page was delivered to the user. An initial communication that includes initial web page data (e.g., the referring source, etc.) and the unique identifier is then transmitted from the user system to an analytics system. The analytics system will then transmit a session cookie pertaining to a current web user session back to the user system. All subsequent communications from the user system to the analytics system will include additional web page data as well as the unique identifier and session cookie. The unique identifier and session cookie are used to correlate the additional web page data with the initial web page data.

According to a first aspect of the present invention, a method for tracking web user sessions is provided. The method comprises: (1) receiving a requested web page on a user system; (2) transmitting an initial communication from the user system to an analytics system, wherein the initial communication includes initial web page data and a unique identifier corresponding to the requested web page; and (3) returning a session cookie to the user system, wherein the session cookie identifies a current web user session.

According to a second aspect of the present invention, a method for tracking web user sessions is provided. The method comprises: (1) requesting a web page on a user system; (2) receiving the web page on the user system from a web server; (3) transmitting an initial communication from the user system to an analytics system, wherein the initial communication includes initial web page data and a unique identifier corresponding to the web page, and wherein the initial web page data identifies a referring source to the web page; (4) returning a session cookie to the user system, wherein the session cookie identifies a current web user session; (5) transmitting an additional communication from the user system to the analytics system, wherein the additional communication includes additional web page data, the unique identifier and the session cookie; and (6) correlating the additional web page data with the initial web page data using the unique identifier and the session cookie.

According to a third aspect of the present invention, a system for tracking web user sessions is provided. The system comprises: (1) a reception system for receiving an initial communication from a user system, wherein the initial communication includes initial web page data and a unique identifier corresponding to a web page received on the user system; (2) a cookie system for providing a session cookie that identifies a current web user session; and (3) a data system for correlating additional web page data received from the user system with the initial web page data based on the session cookie and the unique identifier.

According to a fourth aspect of the present invention, a program product stored on a recordable medium for tracking web user sessions is provided. When executed, the program product comprises: (1) program code for receiving an initial communication from a user system, wherein the initial communication includes initial web page data and a unique identifier corresponding to a web page received on the user system; (2) program code for providing a session cookie that identifies a current web user session; and (3) program code for correlating additional web page data received from the user system with the initial web page data based on the session cookie and the unique identifier.

Therefore, the present invention provides a method, system and program product for tracking web user sessions.

BRIEF DESCRIPTION OF THE DRAWINGS

These and other features of this invention will be more readily understood from the following detailed description of the various aspects of the invention taken in conjunction with the accompanying drawings in which:

FIG. 1 depicts a diagram of a web server, a user system and an analytics system, according to the present invention.

FIG. 2 depicts the analytics system of FIG. 1 in greater detail.

Figure 3A:
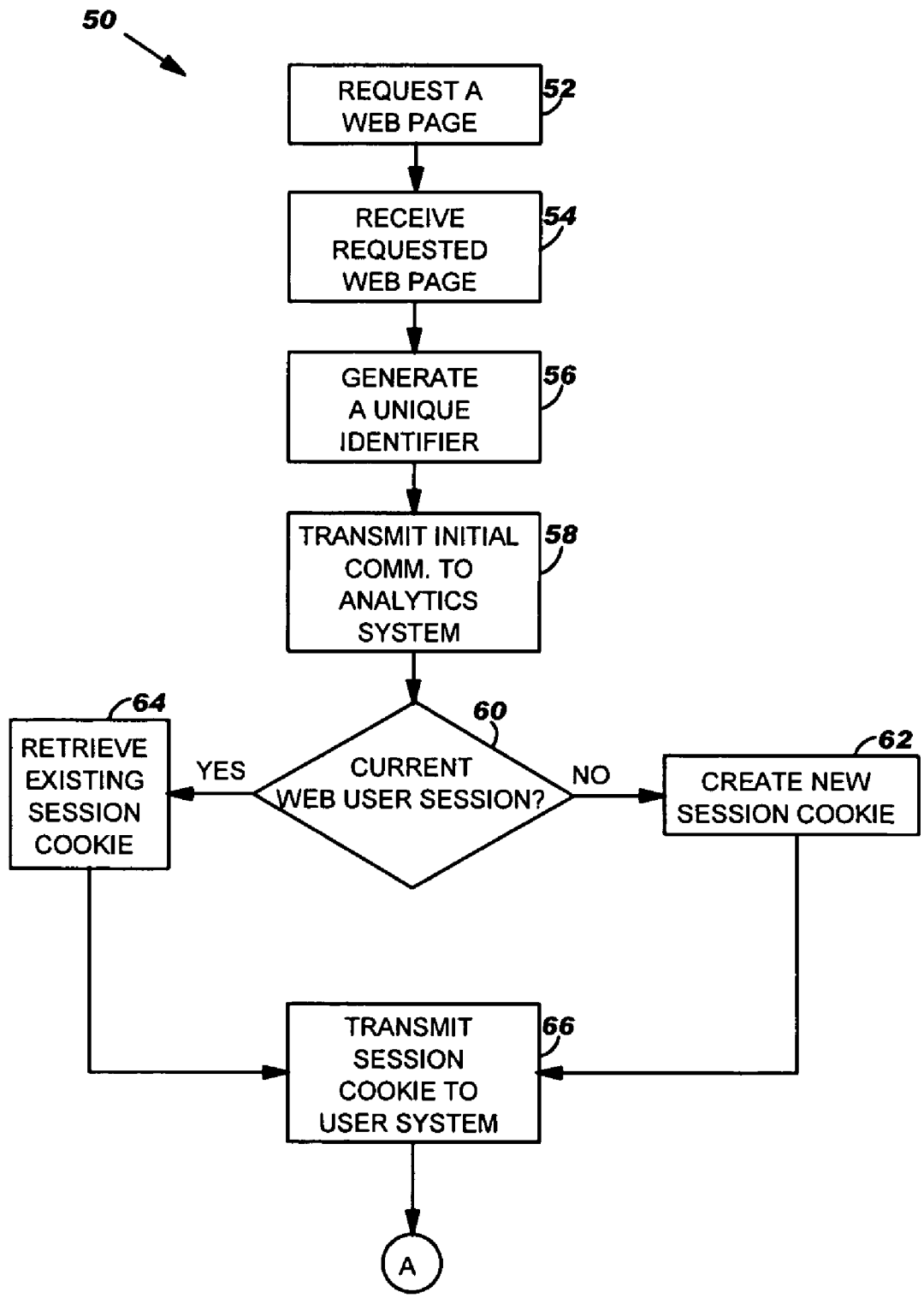
FIG. 3A depicts a first part of a method flow diagram, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

In general, the present invention provides a method, system and program product for tracking web user sessions. Specifically, under the present invention, a user requests a web page on a user system. When the web page is delivered from the web server, program code within the web page is executed to generate a unique "page view" identifier corresponding to the web page. The unique identifier includes a unique value that corresponds specifically to the web page, and a time stamp indicating the date and/or time the web page was delivered to the user. An initial communication that includes initial web page data (e.g., the referring source, etc.) and the unique identifier is then transmitted from the user system to an analytics system. The analytics system will then transmit a session cookie pertaining to a current web user session back to the user system. All subsequent communications from the user system to the analytics system during the web user session will include additional web page data as well as the unique identifier and session cookie. The unique identifier and session cookie are used to correlate the additional web page data with the initial web page data.

Referring to FIG. 1, an architectural diagram of the present invention is shown. As depicted, user system 12 communicates with web server 10 and analytics system 14. User system 12 is intended to represent any type of computerized system (e.g., server, client, workstation, desktop computer, personal digital assistant, cellular telephone, etc.) that can be manipulated by user 26 to obtain and view web content (e.g., web pages). For example, if user 26 requests a particular web page 20 via browser program 18 (e.g., NETSCAPE, Microsoft Internet Explorer, etc.), the request will be routed to web server 10. Web program 16 within web server 10 will then deliver the requested web page 20 to user system 12. To this extent, web program 16 can be any program for delivering web content to user system 12. One example of such a program is WEBSPHERE, which is commercially available from International Business Machines Corp. of Armonk, N.Y.

Under the present invention, when web page 20 is delivered to user system 12, program code (e.g., JavaScript) within web page 20 is run. The code causes a unique identifier corresponding to web page 20 to be generated. Typically, the unique identifier includes a unique value that specifically corresponds to web page 20 as well as a time stamp. This allows web page 20 to be uniquely identified for a particular day/time. Once the unique identifier has been generated, it will be communicated to analytics system 14 along with corresponding web page data. In general, the web page data includes data about web page 20 such as a "referring source" (i.e., how user 26 was referred to web page). Referring sources could include, among other things, hyperlinks within other pages, banner advertisements, etc. Upon receipt of the unique identifier, analysis engine 22 within analytics system 14 will determine whether the communication was received pursuant to an existing web user session or pursuant to a new web user session. If the unique identifier was received pursuant to an existing web user session, the existing web user session and corresponding session cookie will be retrieved (e.g., from database 24). Conversely, if the unique identifier was retrieved pursuant to a new web user session, analysis engine 22 will create a new web user session and session cookie. In either event, a current session cookie will be provided by analysis engine 22. The session cookie typically identifies the particular web user session. Once a current session cookie is provided, the data transmitted in the communication is stored in database 24 according to the unique identifier and the session cookie (e.g., in a table). The unique identifier and session cookie allow all subsequent communications to be matched/corresponded with this previous communication.

After the session cookie is provided, and the data from the initial communication is stored in database 24, the session cookie is transmitted back to user system 12. User system 12 will store the session cookie for the duration (and possibly longer) of the current web user session. A subsequent communication transmitted from user system 12 to analytics system 14 during this web user session will include the session cookie, the unique identifier and additional web page data (e.g., what links are on the page, what banner advertisements are present, etc.). Upon receipt of the subsequent communication, the additional web page data will be correlated in database 24 by matching the session cookie and unique identifier with the same from the initial communication. By routing and storing web page data in this manner, important website usage information (e.g., user volume, referring sources, etc.) can be efficiently collected and analyzed. Among other drawbacks, previous systems failed to provide a way to identify the referring source. That is, previous systems failed to provide a way to capture the first web page in a web user session, a drawback that the present invention overcomes.

Referring now to FIG. 2, a more detailed depiction of analytics system 14 is shown. As depicted, analytics system 14 generally includes central processing unit (CPU) 30, memory 32, bus 34, input/output (I/O) interfaces 36 and external devices/resources 38. CPU 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, a data object, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LED screen, hand-held device, keyboard, mouse, voice recognition system, speech output system, printer, monitor, facsimile, pager, etc. Bus 34 provides a communication link between each of the components in analytics system 14 and likewise may comprise any known type of transmission link, including electrical, optical, wireless, etc. In addition, although not shown, additional components, such as cache memory, communication systems, system software, etc., may be incorporated into analytics system 14.

Database 24 provides storage for information under the present invention. Such information could include, for example, unique identifiers, session cookies, web page data, etc. As such, database 24 may include one or more storage devices, such as a magnetic disk drive or an optical disk drive. In another embodiment, database 24 includes data distributed across, for example, a local area network (LAN), wide area network (WAN) or a storage area network (SAN) (not shown). Database 24 may also be configured in such a way that one of ordinary skill in the art may interpret it to include one or more storage devices.

It should be understood that communication between web server 10, user system 12 and analytics system 14 can occur via a direct hardwired connection (e.g., serial port), or via an addressable connection in a client-server (or server-server) environment. In the case of the latter, the server and client may be connected via the Internet, a wide area network (WAN), a local area network (LAN), a virtual private network (VPN) or other private network. The server and client may utilize conventional network connectivity, such as Token Ring, Ethernet, or other conventional communications standards. Where the client communicates with the server via the Internet, connectivity could be provided by conventional TCP/IP sockets-based protocol. In this instance, the client would utilize an Internet service provider to establish connectivity to the server. It should also be understood that although not shown for brevity purposes, web server 10 and user system 12 typically include computerized components (e.g., CPU, memory, database, etc.) similar to analytics system 14.

Stored in memory 32 of analytics system 14 is analysis engine 22, which includes reception system 40, session system 42, cookie system 44 and data system 46. As indicated above, user 26 requests web page 20 using browser program 18 (e.g., by typing in a URL, clicking on a link, etc.). Web page 20 is generated by web program 16 and sent to user system 12. Upon receipt, program code within web page 20 will execute and generate a unique identifier (e.g., unique value and time stamp) that specifically corresponds to web page 20. Once generated, the unique identifier is communicated with web page data to analytics system 14 as a communication.

The communication is received by reception system 40. Upon receipt, session system 42 will determine whether the communication has been received pursuant to an existing web user session or to a new web user session. Many techniques can be employed to make this determination. For example, if the communication has been received without a session cookie, session system 42 could determine that the communication is an initial communication for a new web user session and create a new session cookie. If, however, the communication includes a session cookie, it could be determined that the web user session already exists and cookie system 44 can retrieve the applicable session cookie from the communication (or from database 24). In general, the session cookie will uniquely identify the particular web user session and will be used in conjunction with the unique "web page" identifier by data system 46 to catalogue the web page data received in the communication. To this extent, database 24 can include a table or the like that correlates web page data with unique identifiers and session cookies.

Once the web page data is stored appropriately, the session cookie is transmitted back to user system 12 (e.g., by cookie system 44). Then, when an additional communication is transmitted during the same web user session, the additional communication will include additional web page data as well as the unique identifier and the session cookie. Similar to the initial communication, reception system 40 will receive the additional communication, and session system 42 will determine whether it is pursuant to a new or existing web user session. In this case, because the communication includes a session cookie, session system 42 could determine that the communication is pursuant to an existing web user session. Accordingly, cookie system 44 can extract the session cookie from the communication or from database 24. The session cookie will then be used by data system 46 in conjunction with the unique identifier to correlate the additional web page data with the initial web page data already stored.

Referring now to FIG. 3A, a method flow diagram 50 of the present invention is shown. As depicted, first step 52 is to request a web page. After the requested web page is received in step 54, a unique identifier will be generated in step 56. As indicated above, the unique identifier is generated by program code within the web page, and typically includes a unique value and a time stamp. Once the unique identifier is generated, an initial communication is transmitted to the analytics system in step 58. The communication includes web page data as well as the unique identifier. Once received by the analytics system, it will be determined whether the communication pertains to a current web user session in step 60. For example, it could be determined whether the communication contains a valid session cookie. If the communication does not contain a valid session cookie, a new web user session and session cookie will be created in step 62. If, however, the communication contains a valid session cookie, a web user session already exists and the session cookie will be retrieved (i.e., extracted from the communication or from storage) in step 64. In any event, the current session cookie will be transmitted back to the user system in step 66 (after the web page data from the initial communication has been stored).

Figure 3B:
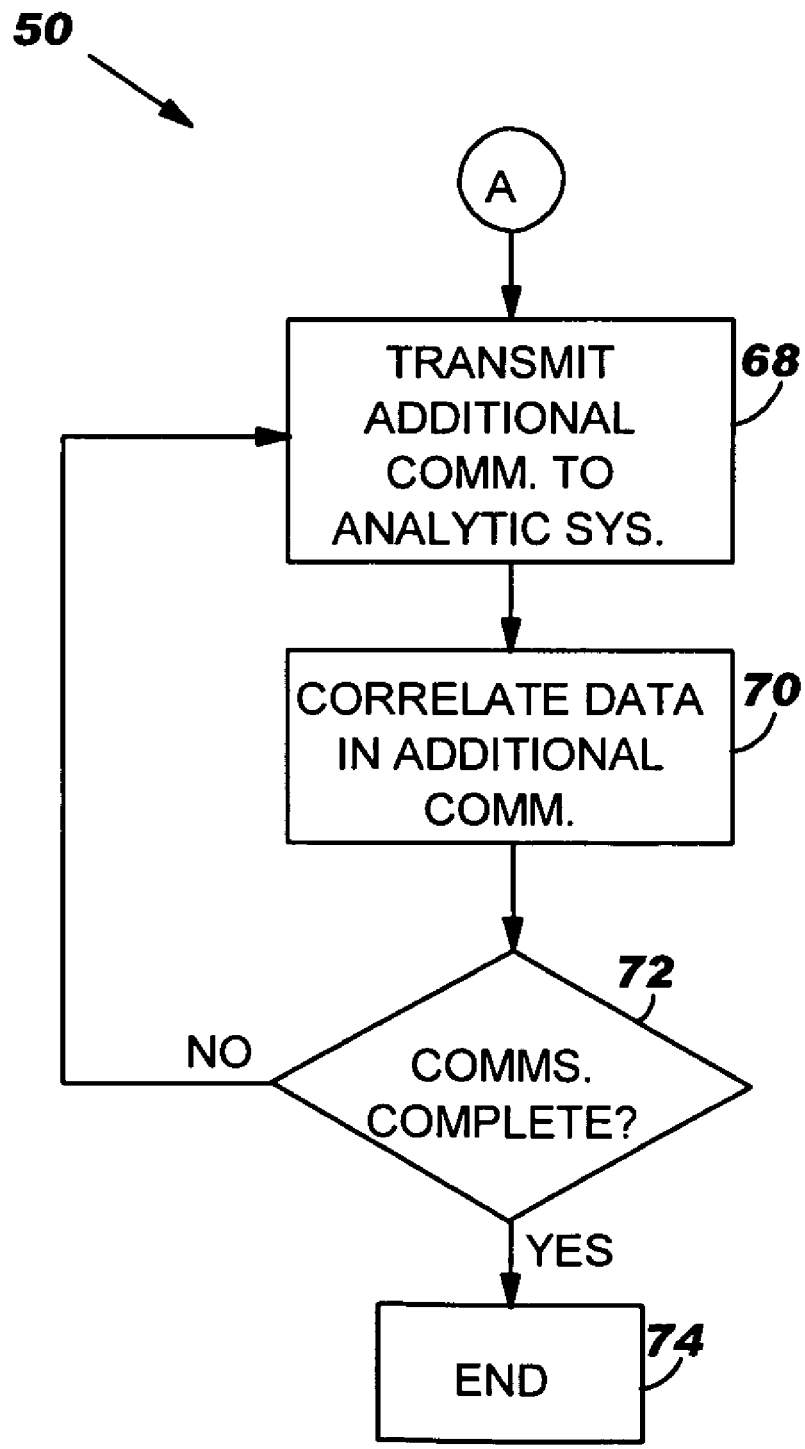
FIG. 3B depicts a second part of the method flow diagram commenced in FIG. 3A.

Referring to FIG. 3B, the method flow diagram continues. As shown, an additional communication during the same web user session is transmitted to the analytics system in step 68. The additional communication will include additional web page data as well as the unique identifier and the session cookie transmitted in step 66 of FIG. 3A. Upon receipt by the analytics system, the additional web page data will be correlated with the initial web page data using the unique identifier and the session cookie in step 70. Then, it will be determined whether the sequence of communications during the current web user session is complete in step 72. If not, any subsequent communications for the same web user session will by transmitted to analytics system and correlated in the same manner. If, however, the web user session is complete, the procedure will end in step 74.

It should be appreciated that the term current web user session is intended to pertain to the web pages viewed at one particular time. For example, a series of web pages accessed by user 26 can be considered one web user session. However, if the user closes the browser and comes back at a later time, a new web user session could be started.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls user system 100 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the depiction of analysis engine 22 in FIG. 2 is for illustrative purposes only. As such, the functionality described herein could be embodied in any quantity of subsystems.

We claim:

1. A system for tracking web user sessions, comprising:
   a reception system for receiving an initial communication from a received web page of a user system, wherein the initial communication includes initial web page data and a unique identifier corresponding to the web page received on the user system solely in response to a request made without previous providing of information for identifying a session to a system associated with the web page by the user system;
   a cookie system for providing a session cookie that identifies a current web user session; and
   a data system for correlating additional web page data received from the user system with the initial web page data based on the session cookie and the unique identifier, wherein the additional communication includes additional web page data, the unique identifier and the session cookie.

2. The system of claim 1, wherein the initial web page data identifies a referring source to the web page that indicates how the user system was referred to the requested web page.

3. The system of claim 1, wherein the unique identifier comprises a time stamp and a unique value corresponding to the web page.

4. The system of claim 1, further comprising a session system for determining whether the current web user session exists.

5. The system of claim 4, wherein the cookie system retrieves an existing session cookie if the current web user session exists.

6. The system of claim 4, wherein the cookie system creates a new session cookie if the current web user session does not exist.

7. The system of claim 1, wherein the system comprises an analytics system that includes a storage system, and wherein the storage system includes a table that correlates web page data with session cookies and unique identifiers.

8. The system of claim 1, wherein the web page is received on the user system from a web server, and wherein the web server and the analytics system are separate systems.

9. The system of claim 1, wherein the unique identifier is created by program code within the web page.

10. A program product stored on a recordable medium for tracking web user sessions, which when executed, comprises:
    program code for receiving an initial communication from a received web page of a user system, wherein the initial communication includes initial web page data and a unique identifier corresponding to a web page received on the user system solely in response to a request made without previous providing of information for identifying a session to a system associated with the web page by the user system;
    program code for providing a session cookie that identifies a current web user session; and
    program code for correlating additional web page data received from the user system with the initial web page data based on the session cookie and the unique identifier, wherein the additional communication includes additional web page data, the unique identifier and the session cookie.

11. The program product of claim 10, wherein the initial web page data identifies a referring source to the web page that indicates how the user system was referred to the requested web page.

12. The program product of claim 10, wherein the unique identifier comprises a time stamp and a unique value corresponding to the web page.

13. The program product of claim 10, further comprising program code for determining whether the current web user session exists.

14. The program product of claim 13, wherein the program code for providing retrieves an existing session cookie if the current web user session exists.

15. The program product of claim 13, wherein the program code for providing creates a new session cookie if the current web user session does not exist.

16. The program product of claim 10, wherein the program product is loaded on an analytics system that includes a storage system, and wherein the storage system includes a table that correlates web page data with session cookies and unique identifiers.

17. The program product of claim 10, wherein the web page is received on the user system from a web server, and wherein the web server and the analytics system are separate systems.

18. The program product of claim 10, wherein the unique identifier is created by program code within the web page.

* * * * *